US012734955B2

(12) United States Patent
Arai et al.

(10) Patent No.: US 12,734,955 B2
(45) Date of Patent: Sep. 15, 2026

(54) VEHICLE EXTERIOR COMPONENT

(71) Applicant: TOYODA GOSEI CO., LTD., Kiyosu (JP)

(72) Inventors: Yuto Arai, Kiyosu (JP); Hideki Toyoyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/372,858

(22) Filed: Oct. 29, 2025

(65) Prior Publication Data

US 2026/0131720 A1 May 14, 2026

(30) Foreign Application Priority Data

Nov. 13, 2024 (JP) ................................ 2024-198063

(51) Int. Cl.

*B60Q 1/26* (2006.01)
*B60Q 1/00* (2006.01)
*B60R 13/00* (2006.01)

(52) U.S. Cl.

CPC ............ *B60Q 1/0005* (2013.01); *B60Q 1/26* (2013.01); *B60R 13/005* (2013.01)

(58) Field of Classification Search

CPC .......... B60Q 1/0005; B60Q 1/26; B60Q 1/00; B60R 13/005; F21W 2102/00; F21W 2103/00; F21W 2104/00; F21V 15/00; F21V 15/01; F21V 25/00; F21V 31/00; F21V 31/03

See application file for complete search history.

(56) References Cited

U.S. PATENT DOCUMENTS 7,168,831 B2 * 1/2007 Cho ........................ B60B 7/006 362/500
2022/0024374 A1 * 1/2022 Studeny ................ B60R 13/005
2023/0250941 A1 * 8/2023 Arai ...................... G09F 21/048 362/546

FOREIGN PATENT DOCUMENTS

JP 2012-126339 A 7/2012

* cited by examiner

*Primary Examiner* — Bao Q Truong
(74) *Attorney, Agent, or Firm* — Posz Law Group, PLC

(57) ABSTRACT

A vehicle exterior component includes a housing that opens toward a vehicle exterior, an outer lens that closes an opening of the housing, a light-emitting substrate disposed inside the housing, and a lid member. A bottom of the housing includes a vent hole and a boss that surrounds an opening of the vent hole and protrudes toward an outside of the housing. The lid member is disposed so as to close an opening of the boss at a distal end of the boss in a protruding direction. The lid member permits passage of gas while restricting passage of liquid.

6 Claims, 3 Drawing Sheets

11
12
13
15
16
17
18
19
20
21
22
23
24
29
30
31

IV
12
22
21
24
23
IV 11
15
32
31
29

VEHICLE EXTERIOR COMPONENT

CROSS-REFERENCE TO RELATED APPLICATIONS

This application is based upon and claims the benefit of priority from Japanese Patent Application No. 2024-198063, filed on Nov. 13, 2024, the entire contents of which are incorporated herein by reference.

BACKGROUND

1. Field

The present disclosure relates to a vehicle exterior component.

2. Description of Related Art

JP2012-126339A discloses a vehicle exterior component including a housing that opens toward the vehicle exterior, an outer lens closing the opening of the housing, and a light-emitting substrate disposed within the housing. One end of an electric wire for supplying power is connected to the light-emitting substrate. The electric wire is routed outward through a wire lead-out hole formed in the bottom of the housing. When the LEDs of the light-emitting substrate are caused to emit light, the light from the LEDs passes through the outer lens. This improves the aesthetic appearance of the vehicle exterior component, as viewed from outside the vehicle.

In view of layout requirements for vehicle exterior components, such as the one described above, relative to the vehicle, and the demand for weight reduction of such components, it has been desirable to reduce the thickness of vehicle exterior components. However, when the vehicle exterior component is made thinner, the available space inside the housing becomes reduced. Consequently, the air flow near the outer lens within the housing is restricted, which may lead to reduced air circulation. As a result, moisture present in the air within the housing may cause the outer lens to fog.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle exterior component includes a housing that opens toward a vehicle exterior, an outer lens that closes an opening of the housing, a light-emitting substrate disposed inside the housing, and a lid member. A bottom of the housing includes a vent hole that allows air to flow into and out of the housing, and a boss that surrounds an opening of the vent hole and protrudes toward an outside of the housing. The lid member is disposed so as to close an opening of the boss at a distal end of the boss in a protruding direction. The lid member permits passage of gas while restricting passage of liquid.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, “at least one of A and B” should be understood to mean “only A, only B, or both A and B.”

A vehicle exterior component according to an embodiment will now be described with reference to FIGS. 1 to 5.

Figure 1:
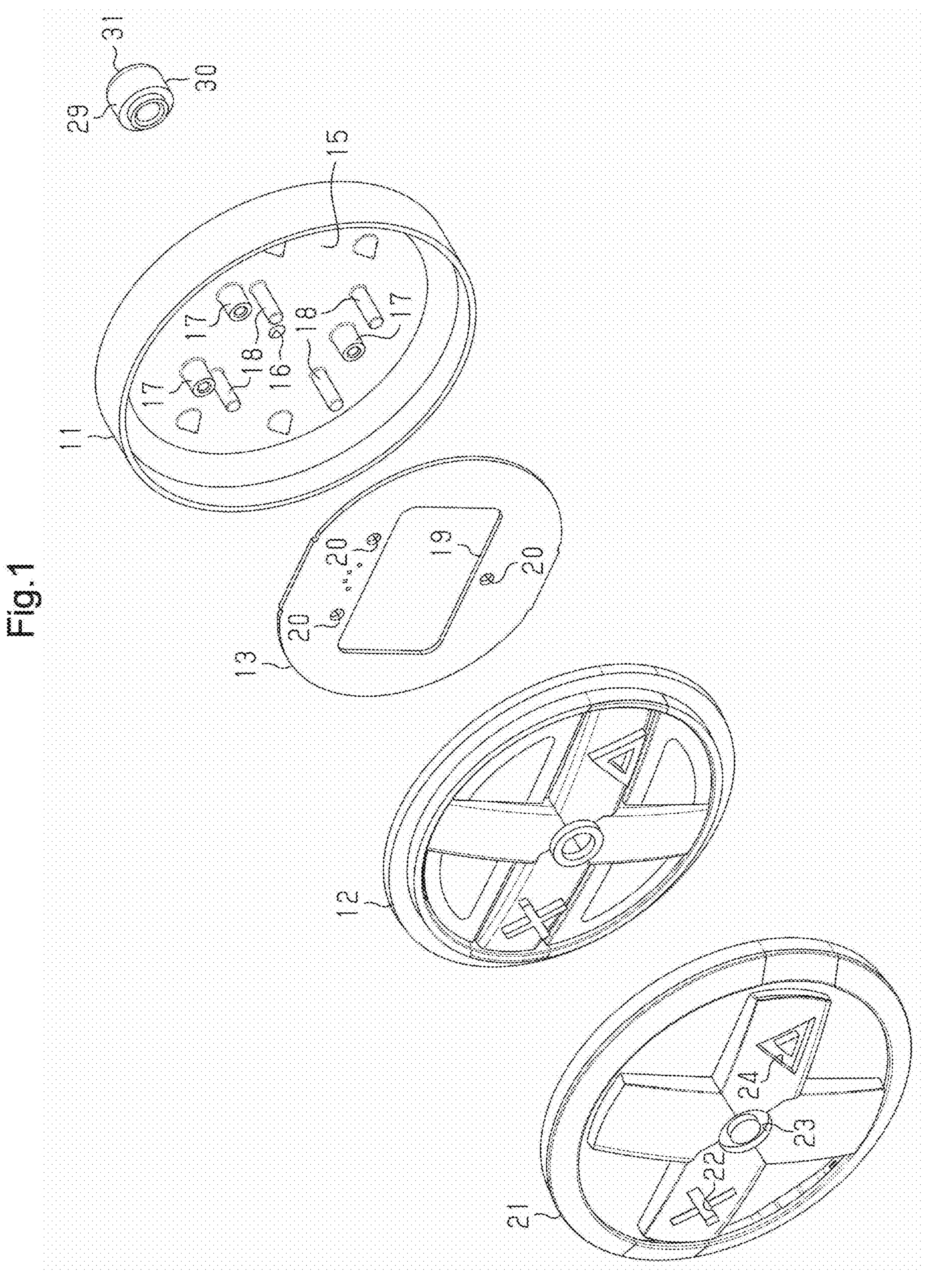
FIG. 1 is an exploded perspective view of a vehicle exterior component.
Figure 2:
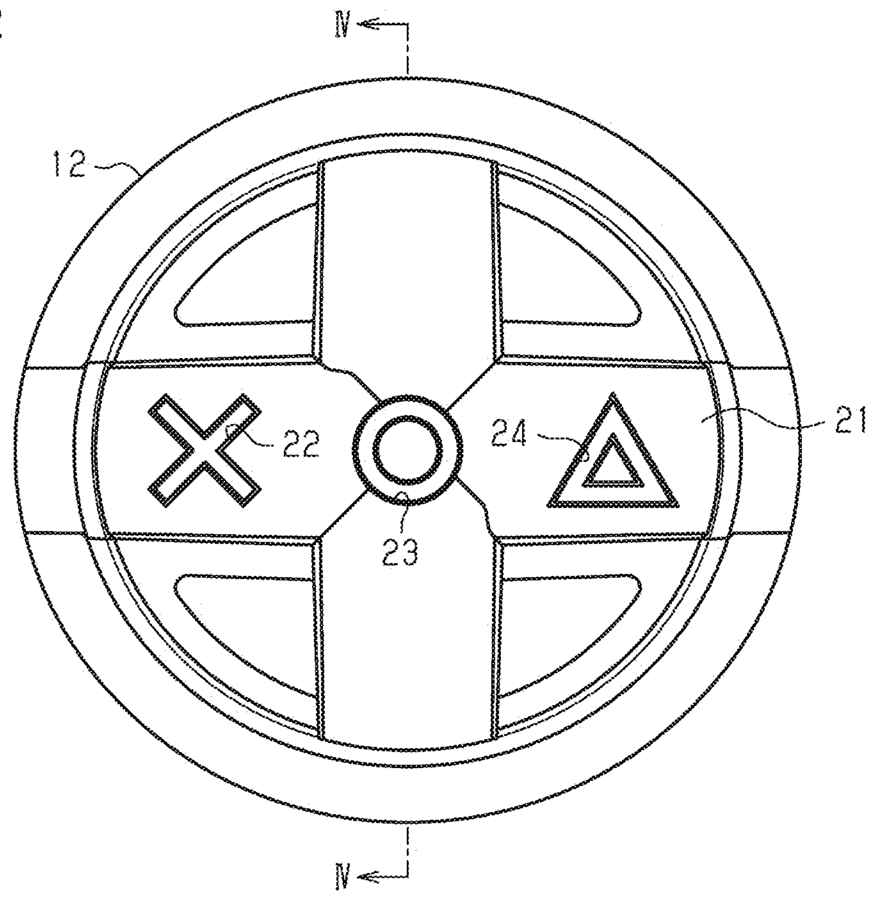
FIG. 2 is a front view showing the vehicle exterior component of FIG. 1 as viewed from the front side.
Figure 3:
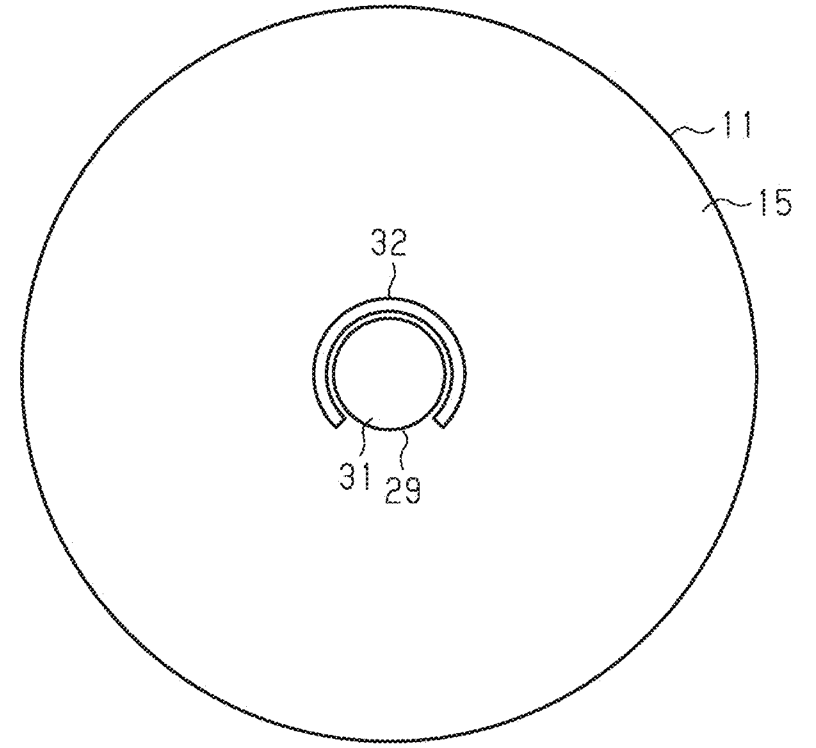
FIG. 3 is a rear view showing the vehicle exterior component of FIG. 1 as viewed from the rear side.

The vehicle exterior component shown in FIGS. 1 to 3 is attached to a vehicle such as an automobile, and is embodied as, for example, a luminous emblem. The vehicle exterior component includes a housing 11 that opens toward the vehicle exterior, an outer lens 12 closing the opening of the housing 11, and a light-emitting substrate 13 disposed within the housing 11.

A bottom 15 of the housing 11 shown in FIG. 1 includes a vent hole 16 for allowing air to flow into and out of the housing 11. The vent hole 16 is located at a center of the bottom 15. The bottom 15 includes multiple attaching portions 17 and multiple support portions 18 around the vent hole 16. The attaching portions 17 and the support portions 18 protrude from the bottom 15 of the housing 11 toward the opening of the housing 11.

The attaching portions 17 are used to attach the light-emitting substrate 13 to the housing 11, and are arranged at intervals around the vent hole 16. The support portions 18 are provided to maintain a prescribed distance between the light-emitting substrate 13 and the bottom 15 of the housing 11, and are disposed at intervals around the vent hole 16.

The light-emitting substrate 13 is disposed in the housing 11 so as to be substantially parallel to the bottom 15. The light-emitting substrate 13 includes a center hole 19 in a center. The light-emitting substrate 13 also includes attaching holes 20 at positions corresponding to the attaching portions 17 of the bottom 15. Portions of the light-emitting substrate 13 excluding the center hole 19 and the attaching holes 20 are allowed to contact the support portions 18 of the bottom 15.

Light emitted by the light-emitting substrate 13 passes through the outer lens 12, which closes the opening of the housing 11. This improves the aesthetic appearance of the vehicle exterior component, when viewed from outside the vehicle. The outer lens 12 is covered with a front surface panel 21. The front surface panel 21 includes holes 22 to 24 having specified shapes such as characters at specified positions, and is formed such that light does not pass through portions other than the holes 22 to 24. Accordingly, when the light-emitting substrate 13 emits light, illumination is provided at portions of the outer lens 12 corresponding to the character-shaped holes 22 to 24 of the front surface panel 21.

Internal Structure of the Vehicle Exterior Component

Figure 4:
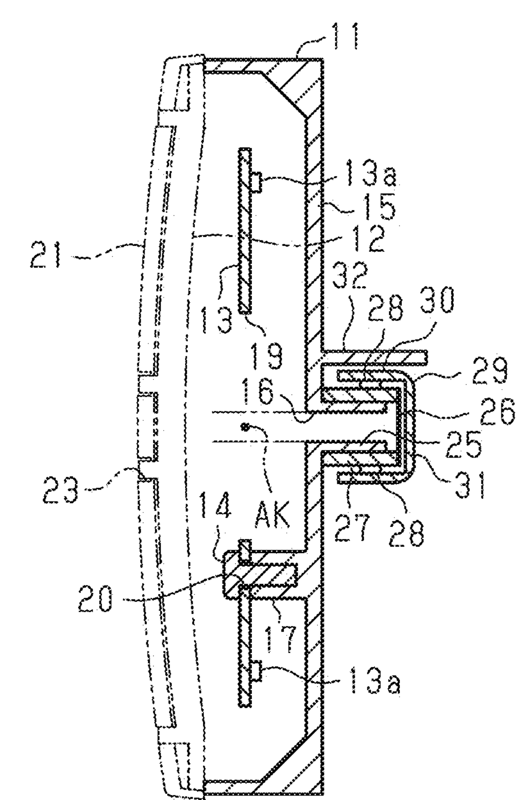
FIG. 4 is a cross-sectional view showing the vehicle exterior component of FIG. 2 as viewed from the direction of arrow IV-IV.

As shown in FIG. 4, the light-emitting substrate 13 in the housing 11 is attached to the attaching portions 17 of the bottom 15 with screws 14. Specifically, the screws 14 are inserted into the attaching holes 20 of the light-emitting substrate 13 and screwed into the attaching portions 17 of the bottom 15, so that the light-emitting substrate 13 is attached to the attaching portions 17. At this time, the support portions 18, which protrude from the bottom 15 as shown in FIG. 1, come into contact with the light-emitting substrate 13. Accordingly, the light-emitting substrate 13 is supported by the bottom 15 of the housing 11 via the support portions 18.

When the light-emitting substrate 13 is attached to the housing 11 in this manner, the center hole 19 of the light-emitting substrate 13 is arranged to correspond to the vent hole 16 in the bottom 15 of the housing 11. In other words, since the light-emitting substrate 13 has the center hole 19, the region within the housing 11 along the extension of the vent hole 16, as shown in FIG. 4, forms an empty space AK, in which the light-emitting substrate 13 is not disposed.

The light-emitting substrate 13 includes LEDs 13*a* that emit light towards the bottom 15 of the housing 11. The bottom 15 of the housing 11 is configured to reflect light from the LEDs 13*a* of the light-emitting substrate 13 towards the outer lens 12. Specifically, the surface of the bottom 15 facing the light-emitting substrate 13 is coated with a reflective coating for reflecting light from the LEDs 13*a*. As a result, light emitted from the LEDs 13*a* is reflected by the bottom 15 and then passes through the outer lens 12.

To uniformly illuminate the outer lens 12 with the light that passes therethrough, it is preferable to increase the length of the optical path from the LEDs 13*a* to the outer lens 12. As described above, by reflecting the light emitted from the LEDs 13*a* at the bottom 15 before it passes through the outer lens 12, the necessary optical path length from the LEDs 13*a* to the outer lens 12 is ensured, even when the vehicle exterior component is reduced in thickness.

Structure Around the Vent Hole of the Vehicle Exterior Component

Figure 5:
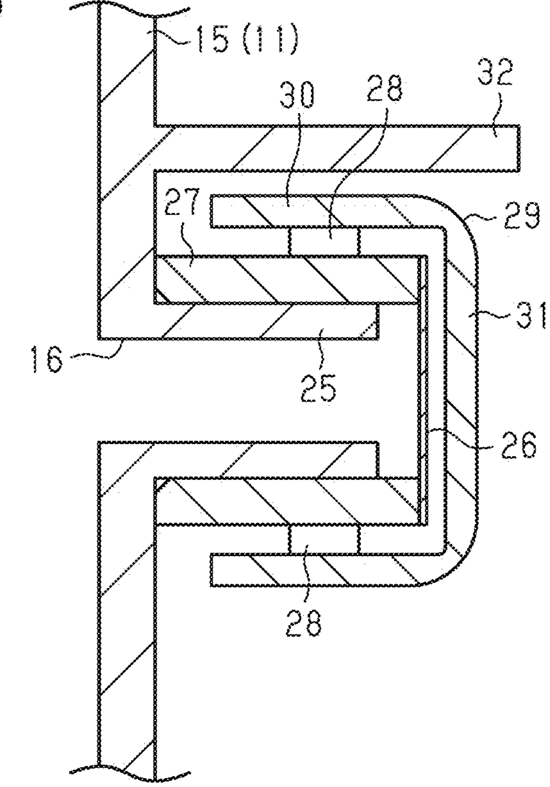
FIG. 5 is an enlarged cross-sectional view showing a structure including a vent hole of the vehicle exterior component of FIG. 4.

As shown in FIG. 5, the bottom 15 of the housing 11 includes a cylindrical boss 25. The boss 25 surrounds the opening of the vent hole 16 and protrudes outward from the housing 11. A lid member 26 is disposed so as to close the opening of the boss 25 at the distal end of the boss 25 in the protruding direction. The lid member 26 permits passage of gas while restricting passage of liquid. Specifically, the lid member 26 is formed of a material capable of providing such functionality. However, such material is prone to generating static electricity.

A cylindrical insulating member 27 made of an electrically insulating material such as rubber is disposed around the boss 25; that is, on the outer circumferential surface of the boss 25. The insulating member 27 is fitted to the outer circumferential surface of the boss 25. The insulating member 27 includes multiple projections 28 on the outer circumferential surface at intervals in the circumferential direction. The lid member 26 is attached to the insulating member 27 at a position corresponding to the opening of the boss 25. Specifically, the lid member 26 is attached to the above-described position by an adhesive or the like.

The periphery and the opening of the boss 25, in other words, the periphery and the opening of the insulating member 27, are covered with a cover 29 made of an electrically insulting material such as rubber. The cover 29 includes a cylindrical side wall 30 and a bottom wall 31 that closes one end of the side wall 30 in the axial direction. The inner circumferential surface of the side wall 30 of the cover 29 is in contact with the distal ends of the projections 28 of the insulating member 27.

Accordingly, a prescribed distance is maintained between the outer circumferential surface of the insulating member 27 and the side wall 30 of the cover 29. Therefore, a specified distance is also maintained between the side wall 30 of the cover 29 and the outer circumferential surface of the boss 25. At this time, a prescribed distance is also maintained between the opening of the boss 25, that is, the lid member 26 disposed in the opening of the insulating member 27, and the bottom wall 31 of the cover 29. Therefore, a specified distance is also maintained between the bottom wall 31 of the cover 29 and the opening of the boss 25.

The bottom 15 of the housing 11 includes a rib 32 protruding in the same direction as the boss 25. The rib 32 covers the upper side of the cover 29. Specifically, the rib 32 not only covers the upper side of the cover 29 as shown in FIG. 5, but also covers the sides of the side wall 30 of the cover 29 by extending downward along the circumferential direction of the side wall 30 of the cover 29. In other words, the rib 32 has a shape opened downward.

The vehicle exterior component according to the present embodiment has the following advantages.

(1) The bottom 15 of the housing 11 includes the vent hole 16. The vent hole 16 is closed by the lid member 26, which permits passage of gas while restricting passage of liquid. This allows air to flow into and out of the housing 11 through the vent hole 16. As a result, even if the space in the housing 11 is narrowed by reducing the thickness of the vehicle exterior component, the fluidity of air in the vicinity of the outer lens 12 in the housing 11 is not lowered. This prevents fogging of the outer lens 12 due to moisture contained in the air inside the housing 11. In addition, the lid member 26, which closes the opening of the vent hole 16, prevents foreign matter such as water and dust from entering the housing 11 through the vent hole 16.

(2) The lid member 26 is made of a material that is prone to generating static electricity. The lid member 26 is disposed as follows so that the light-emitting substrate 13 does not malfunction due to static electricity generated in the lid member 26. The bottom 15 of the housing 11 includes the boss 25, which surrounds the opening of the vent hole 16 and protrudes outward from the housing 11. The lid member 26 is disposed in the opening of the boss 25. This arrangement of the lid member 26 ensures a relatively long distance between the lid member 26 and the light-emitting substrate 13. This prevents the static electricity generated in the lid member 26 from hindering the function of the light-emitting substrate 13. In addition, since it is not necessary to provide a capacitor or the like to suppress the influence of static electricity on the light-emitting substrate 13, the manufacturing costs of the light-emitting substrate 13 are reduced.

(3) The lid member 26 is attached to the insulating member 27, which is disposed around the boss 25. This effectively blocks the influence of static electricity generated in the lid member 26 on the light-emitting substrate 13.

(4) The air flowing into and out of the housing 11 passes through the space between the inner surface of the cover 29 and the outer surface of the insulating member 27. Further, since the insulating member 27 is disposed around the boss 25, there is a possibility that the static electricity generated in the lid member 26 is propagated to the light-emitting substrate 13 via the air outside the housing 11 and the housing 11. However, the propagation distance of the static electricity between the lid member 26 and the light-emitting substrate 13 in such propagation is lengthened by the space between the inner surface of the cover 29 and the outer surface of the insulating member 27. Accordingly, propagation of static electricity from the lid member 26 to the light-emitting substrate 13 via the space is unlikely to occur.

(5) Since the upper side of the cover 29 is covered with the rib 32, foreign matter such as water or dust is unlikely to enter the space between the inner surface of the cover 29 and the outer surface of the insulating member 27. As a result, foreign matter is unlikely to reach the lid member 26 via the space between the inner surface of the cover 29 and the outer surface of the insulating member 27.

(6) The region within the housing 11 along the extension of the vent hole 16 is the empty space AK, in which the light-emitting substrate 13 is not disposed. Accordingly, since the distance between the light-emitting substrate 13 and the lid member 26 is further increased, it is possible to more effectively prevent the static electricity generated in the lid member 26 from hindering the function of the light-emitting substrate 13.

(7) In order to uniformly illuminate the outer lens 12, it is necessary to lengthen the path of the light from the light-emitting substrate 13 to the outer lens 12 to some extent. Therefore, the following are employed as the light-emitting substrate 13 and the housing 11 of the vehicle exterior component. The LEDs 13*a* of the light-emitting substrate 13 emit light toward the bottom 15 of the housing 11. The bottom 15 of the housing 11 reflects light from the LEDs 13*a* of the light-emitting substrate 13 toward the outer lens 12. Employing the light-emitting substrate 13 and the housing 11 having the above-described configuration allows the light-emitting substrate 13 to be disposed at a position away from the bottom 15 of the housing 11 in order to ensure a sufficient length of the path of light from the light-emitting substrate 13 to the outer lens 12. Such arrangement of the light-emitting substrate 13 ensures a sufficient length of the path of the light so as to uniformly illuminate the outer lens 12. Further, the above-described arrangement of the light-emitting substrate 13 facilitates an increase in the distance between the lid member 26 and the light-emitting substrate 13.

The above-described embodiment may be modified as follows. The above-described embodiment and the following modifications can be combined if the combined modifications remain technically consistent with each other.

Although the light from the LEDs 13*a* of the light-emitting substrate 13 is reflected by the bottom 15 of the housing 11 toward the outer lens 12, such a structure does not necessarily need to be employed. The light-emitting substrate 13 may be disposed so as to emit light from the LEDs 13*a* directly toward the outer lens 12.

The empty space AK in the housing 11 does not necessarily need to be provided. Specifically, the center hole 19 of the light-emitting substrate 13 may be omitted so that the light-emitting substrate 13 is positioned on the extension of the vent hole 16 in the housing 11.

The position of the vent hole 16 in the bottom 15 of the housing 11 may be changed.

The number of vent holes 16 may be changed. In this case, the numbers of the insulating members 27 and the ribs 32 are also changed in accordance with the number of the vent holes 16.

The rib 32 may cover only the upper side of the cover 29.

The rib 32 may be omitted.

The cover 29 does not necessarily have to be formed of an electrically insulating material.

The cover 29 may be omitted.

The insulating member 27 may be omitted, and the lid member 26 may be attached to the opening of the boss 25 with an adhesive or the like.

The present disclosure may also be employed in vehicle exterior components other than luminous emblems, for example, to other vehicle exterior components such as an illuminated grille.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle exterior component, comprising:
a housing that opens toward a vehicle exterior;
an outer lens that closes an opening of the housing;
a light-emitting substrate disposed inside the housing; and
a lid member, wherein
a bottom of the housing includes:
a vent hole that allows air to flow into and out of the housing; and
a boss that surrounds an opening of the vent hole and protrudes toward an outside of the housing,
the lid member is disposed so as to close an opening of the boss at a distal end of the boss in a protruding direction, and
the lid member permits passage of gas while restricting passage of liquid.

2. The vehicle exterior component according to claim 1, further comprising an insulating member that is made of an electrically insulating material and disposed around the boss,
wherein the lid member is attached to the insulating member at a position corresponding to the opening of the boss.

3. The vehicle exterior component according to claim 2, further comprising a cover that is disposed so as to cover a periphery and the opening of the boss at a prescribed distance from the boss.

4. The vehicle exterior component according to claim 3, wherein the bottom of the housing includes a rib protruding in a same direction as the boss, and the rib covers an upper side of the cover.

5. The vehicle exterior component according to claim 1, wherein a region within the housing along an extension of the vent hole is an empty space in which the light-emitting substrate is not disposed.

6. The vehicle exterior component according to claim 1, wherein the light-emitting substrate is configured to emit light towards the bottom of the housing, and the bottom of the housing is configured to reflect light from the light-emitting substrate towards the outer lens.

* * * * *